(Model.)
C. H. GIFFORD.
SEWING MACHINE.
No. 255,500. Patented Mar. 28, 1882.
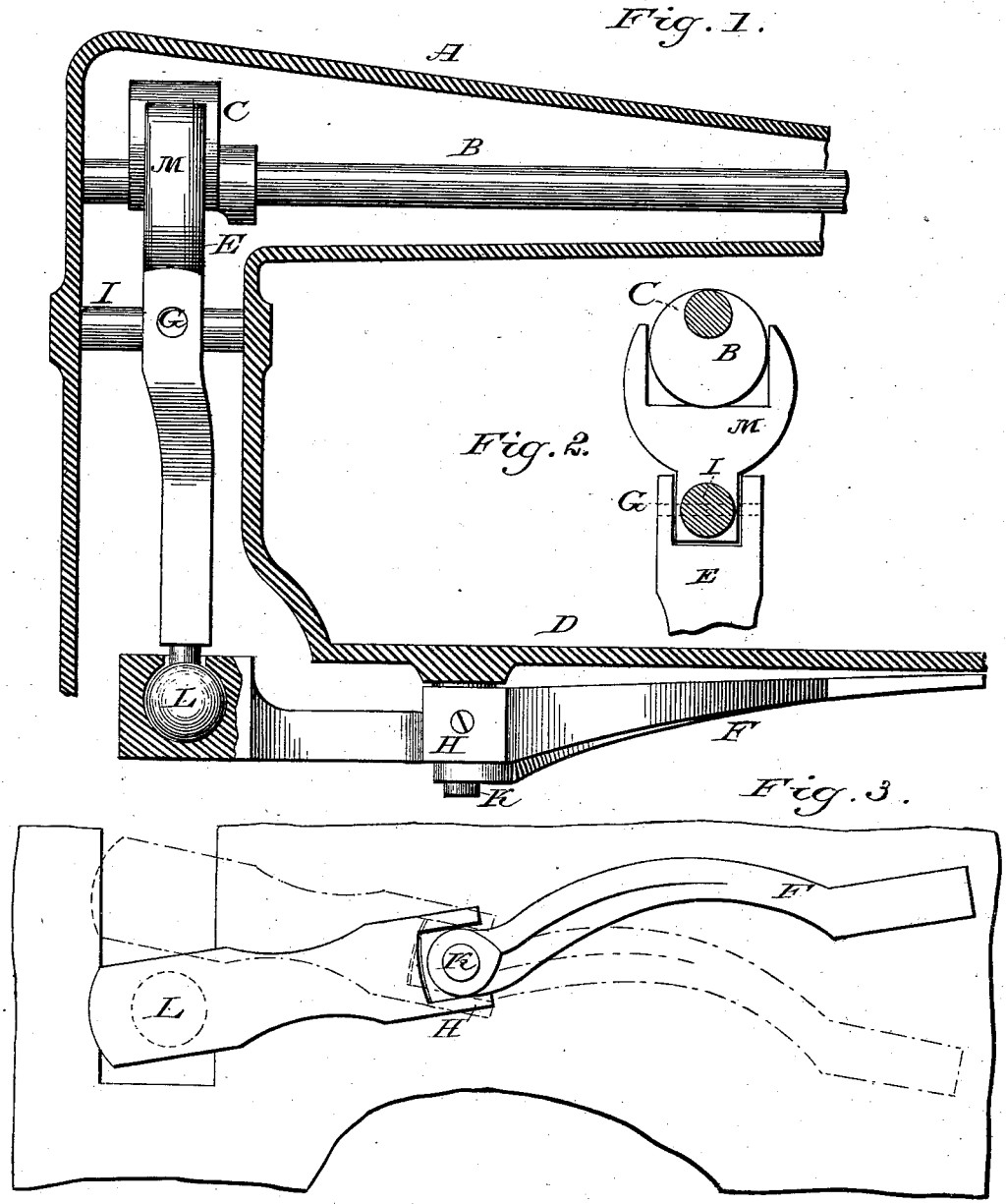
Witnesses:
Geo. B. Hakins
E. H. Briggs
Inventor:
Charles H Gifford

UNITED STATES PATENT OFFICE.

CHARLES H. GIFFORD, OF NORWOOD, NEW YORK.

SEWING-MACHINE.

SPECIFICATION forming part of Letters Patent No. 255,500, dated March 28, 1882.

Application filed November 9, 1881. (Model.)

*To all whom it may concern:*

Be it known that I, CHARLES H. GIFFORD, a citizen of the United States, residing at Norwood, in the county of St. Lawrence, State of New York, have invented a new and useful Improvement in Sewing-Machines, of which the following is a specification.

My invention relates to improvements in that class of sewing-machines in which the shuttle-lever is actuated by the shuttle-lever driver, said shuttle-lever driver being actuated by a cam or crank on the main shaft of the sewing-machine; and it consists of the manner of making the connection of the shuttle-lever with the shuttle-lever driver.

In machines of this class the usual way of making the connection of the shuttle-lever with the shuttle-lever driver is to have the end of the shuttle-lever forked at the end where the connection is made and the end of shuttle-lever driver working between the prongs of the fork, the prongs of the fork being of sufficient width to allow the working of the end of shuttle-lever driver between the prongs of the fork. It is evident, as the shuttle-lever driver has a pendulum or perpendicular vibratory motion and the shuttle-lever has a horizontal vibratory motion, that, owing to the circular movement of the ends of the levers where they are connected, there must be more or less friction from the working of the end of the shuttle-lever driver between the prongs of the fork at the end of the shuttle-lever, the friction being more or less, according to the length of the vibratory movement of the levers.

The object of my improvement is to make a better connection of the shuttle-lever with the shuttle-lever driver, in which there shall be less friction, and that shall be noiseless. I attain these objects by the mechanism illustrated in the accompanying drawings, in which—

Figure 1 is a vertical section of the part of the sewing-machine containing my improvements; Fig. 2, a detailed view of shuttle-lever driver; Fig. 3, a detailed view of the shuttle-lever.

Similar letters refer to similar parts throughout the several views.

A represents the arm of the sewing-machine; B, the main shaft; C, the cam on the main shaft; M, the connection of the lever E with the cam C. The shuttle-lever driver E is actuated by the cam C on the main shaft B, vibrates on the stud I, and has a hinge, G. This lever is connected with the lever F by the ball-joint L. The lever F vibrates on the stud K, and has a hinge, H, and is actuated by the lever E by its being connected by the ball-joint L. In the working of this device, as the ends of the levers E and F at the ball-joint L move from and toward the center of their vibratory motion the hinges G and H allow them a motion at right angles of their vibratory motion. When the ends of the levers E and F at the ball-joint L move from the center of their vibration the lever E moves inward to the right and the lever F upward. As the levers E and F move from the extent of their vibration to the center of their vibration the lever E moves outward to the left and the lever F downward. Thus by having the hinges G and H in the levers E and F and connecting said levers by the ball-joint L it makes what may be termed a "universal joint," which accommodates itself to the circular vibratory motions of the levers E and F, thus avoiding much of the friction that is unavoidable in the common manner of making the connection of the shuttle-lever with the shuttle-lever driver.

I do not claim any particular manner of making the hinges G and H. They may be made in any suitable manner.

The hinges in the levers E and F may be made near the studs I and K, or may be made near the ball-joint L.

Having described my invention so that those skilled in the art may make and use the same, what I desire to secure by Letters Patent is—

1. In a sewing-machine, the vibratory shuttle-lever driver E, having a hinge, G, substantially as herein set forth.

2. In a sewing-machine, the shuttle-lever F, having a hinge, H, substantially as herein set forth.

3. In combination with the shaft B and the cam C in a sewing-machine, the combination of the hinged lever E and hinged lever F with the ball-joint L, substantially as herein set forth.

C. H. GIFFORD.

Witnesses:
THOS. N. MURPHY,
ELIJAH GREEN.